Jan. 11, 1938.  S. F. BRIGGS  2,105,343
BUTTERFLY VALVE
Filed Sept. 16, 1936  2 Sheets-Sheet 1
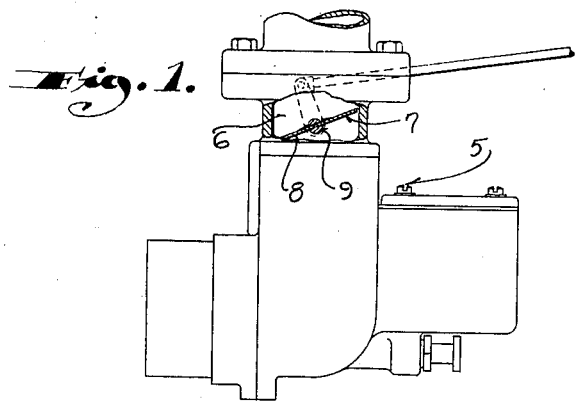
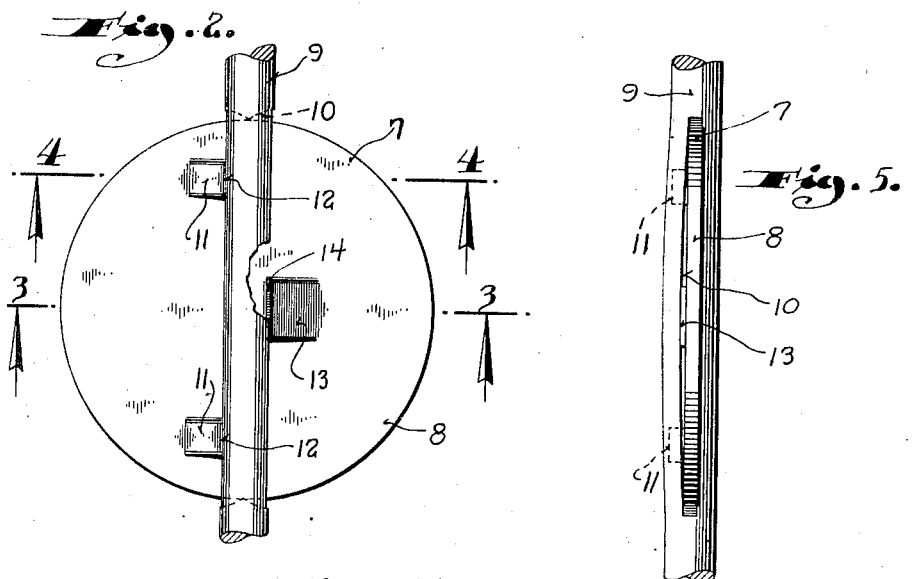
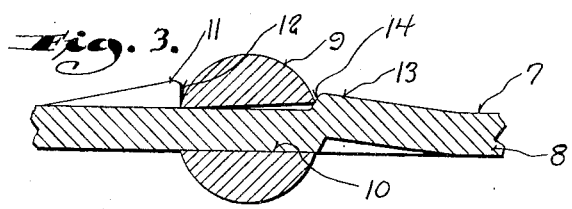
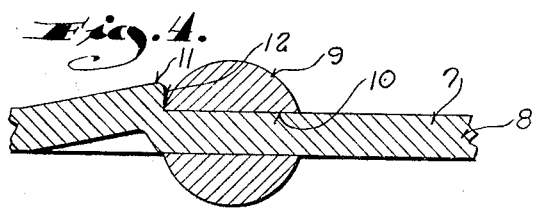
Inventor
Stephen F. Briggs
By ...
Attorney

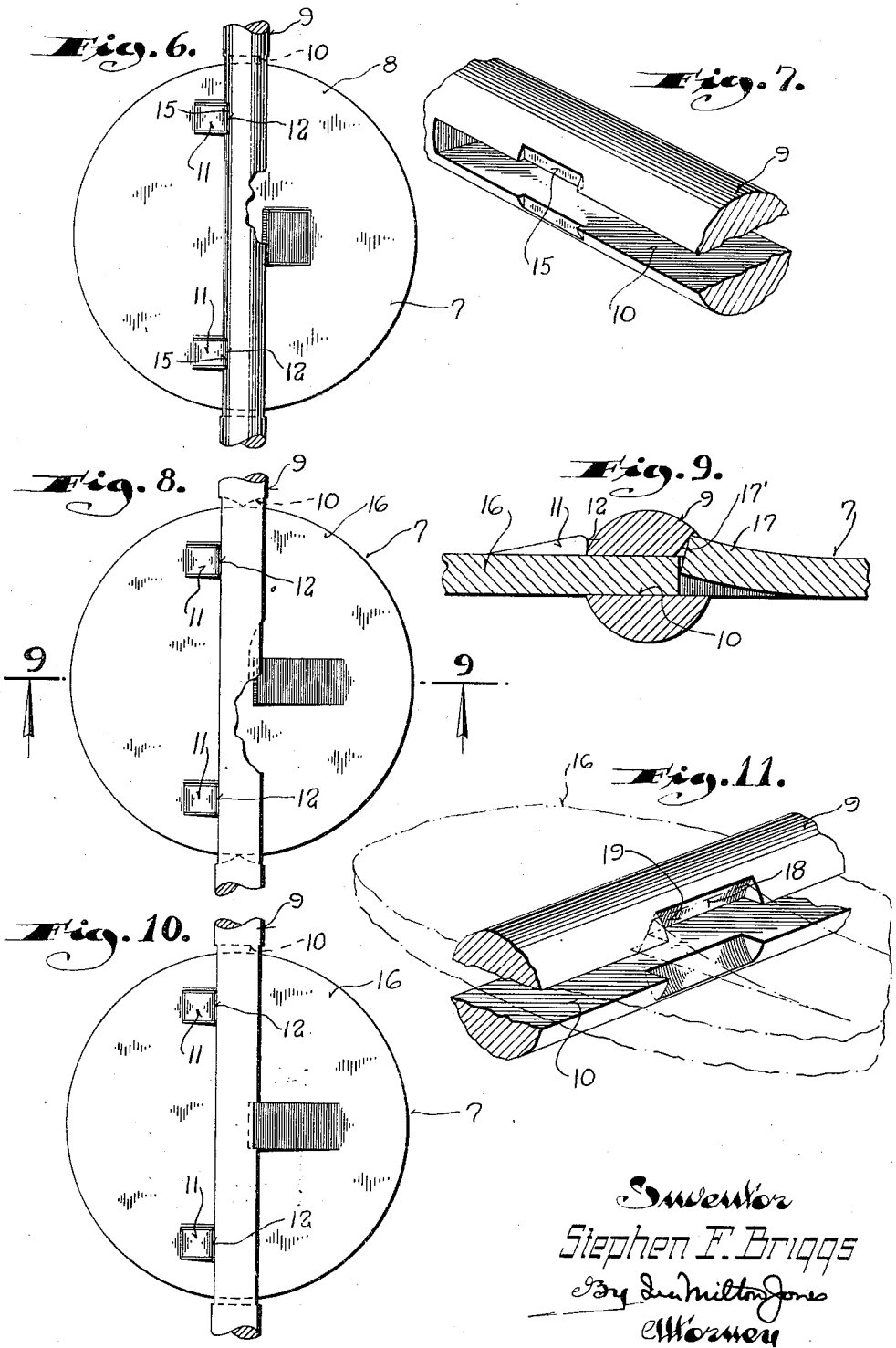

Patented Jan. 11, 1938

2,105,343

UNITED STATES PATENT OFFICE 2,105,343

BUTTERFLY VALVE

Stephen F. Briggs, Detroit, Mich., assignor to Briggs & Stratton Corporation, Milwaukee, Wis., a corporation of Delaware Application September 16, 1936, Serial No. 101,122

3 Claims. (Cl. 251—11)

This invention relates to valves and refers particularly to the butterfly type of valve used in carburetors.

Valves of this type now generally in use are costly constructions because of the number of separate operations required in their manufacture, and the time required for assembling.

Also, the use of screw fastening means as heretofore employed in butterfly valves is objectionable in that vapor can leak past the threads of the screw.

With these and other objections to past valve constructions in mind, this invention contemplates as one of its objects an improved and simplified manner of fastening valves to their stems whereby leakage is rendered impossible and the cost of manufacture greatly reduced.

Another object of this invention is to provide a butterfly valve with fastening means which securely holds the parts against rattling.

With the above and other objects in view which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate several complete examples of the physical embodiment of the invention constructed according to the best modes so far devised for the practical application of the principles thereof, and in which:

Figure 1 is a view of a conventional carburetor with parts broken away and in section illustrating the application of the invention;

Figure 2 is a plan view of the valve per se;

Figure 3 is an enlarged sectional view through Figure 2 on the plane of the line 3—3;

Figure 4 is an enlarged sectional view through Figure 2 on the plane of the line 4—4;

Figure 5 is an end view of the valve to show the relationship of the parts during the assembly thereof;

Figure 6 is a view similar to Figure 2 illustrating a slightly modified form of the invention;

Figure 7 is a fragmentary perspective of the stem shown in Figure 6;

Figure 8 is a view similar to Figure 2 illustrating another slightly modified form of the invention;

Figure 9 is an enlarged sectional view through Figure 8 on the plane of the line 9—9;

Figure 10 is a view similar to Figure 2 illustrating still another slightly modified form of the invention; and Figure 11 is a fragmentary perspective of the stem shown in Figure 10.

Referring now particularly to the accompanying drawings, the numeral 5 represents a carburetor of conventional construction, having the customary mixing chamber 6 in which a butterfly valve 7 is positioned to act as a throttle valve controlling the flow of fuel mixture from the carburetor.

The valve 7 consists of a disk 8 and a stem 9 upon which the disk is mounted, the stem being journaled in the walls of the tube in which the valve is positioned.

Heretofore, the disk of a butterfly valve was either formed about the outside of the stem or passed through a slot therein, but in each instance the disk was secured in place by screws. In the present construction the stem 9 has a slot 10 to receive the disk. At its slotted portion, the cross section of the stem is in the form of two spaced segments whose chords are parallel.

The disk 8 is a round sheet metal plate and has a pair of spaced abutments 11 struck out from one surface thereof. These abutments have faces 12 adapted to engage one side of the stem at one edge of one of the chords, as shown in Figure 4.

Between the two abutments 11 is an abutment 13 having an inwardly slanting face 14 opposing the faces 12 of the abutments 11. The lower innermost edge of the face 14 is transversely spaced from the faces 12 of the abutments 11 a distance less than the length of the chords of the segments of the stem so that when the disk and stem are assembled, the connection therebetween is permanently free from loosening or rattling as will be hereinafter more fully described.

In assembling the valve it is merely necessary to press the disk 8 through the slot 10. As the abutment 13, which is not as high as the abutments 11 is reached, the slot 10 will expand sufficiently to allow the same to pass through the slot, as clearly shown in Figure 5. The faces 12 of the abutments 11 limit the movement of the disk 8 through the slot at the proper time.

Immediately upon the passage of the abutment 13 through the slot, the upper segment of the stem wedges itself between the faces 12 of the abutments 11 and the slanting face 14 of abutment 13. This condition is accomplished automatically by virtue of the resiliency of the stem. The tendency of the stem 9 to attain its normal state keeps the stem tightly clamped to the disk and thereby prevents any shifting or rattling between the parts.

A slightly modified form of the invention is shown in Figures 6 and 7. The construction in this case is similar to that described with the exception that the stem 9 has square shouldered notches 15 to receive the abutments 11 so as to prevent endwise shifting of the disk with respect to the stem.

Another slightly modified form of the invention is shown in Figures 8 and 9. In this instance, the disk 16 is made of spring metal and in place of the abutment 13 has a tine 17 punched up from one surface. The end of the tine 17 engages against an inwardly beveled edge 17' on one segment of the stem, as shown in Figure 9, and through the spring action of the tine wedges the segment of the stem against the faces 12 of the abutments 11.

Another modification of the invention is shown in Figures 10 and 11. In this instance, the beveled edge 18 against which the spring tine or tongue engages is the bottom of a square shouldered notch 19 formed in the stem by a milling cutter or the like. The notch 19 is of a width equal to that of the tine so that engagement of the tine therein holds the parts against shifting endwise.

From the foregoing description taken in connection with the accompanying drawings, it will be readily apparent to those skilled in the art that this invention provides an exceedingly simple manner of securing the disk of a butterfly valve to its stem and that this construction is not only less expensive than that of past constructions, but also better than prior constructions; and that the invention while illustrated as applied to the throttle valve of a carburetor is not limited thereto but encompasses butterfly valves for any purposes.

What I claim as my invention is:

1. In a valve of the character described, a stem having a transverse slot, a disk disposed in the slot, and means for holding the disk in the slot comprising opposed sets of abutments on the stem and disk, one of the stem carried abutments being inclined and the cooperating disc carried abutment being resilient and the direction of inclination of said inclined abutment being such that the resiliency of its cooperating disc carried abutment holds the parts securely against shifting.

2. In combination, a slotted valve stem having an inclined surface at one edge of the slot, a valve disc disposed in said said slot and having spaced projections formed thereon to engage said inclined surface and the opposite edge of the slot so as to secure the disc assembled with the stem, the projection of the valve disc which engages said inclined surface comprising a spring finger yieldingly urged to engage the inclined surface with a spring tension whereby the stem is wedged between the two projections.

3. A butterfly valve comprising, a stem having a slot extending transversely therethrough, a disc disposed in said slot, one edge of the slot having a surface inclined toward the center of the stem so that it forms an obtuse angle with the adjacent wall of the slot, an abutment projecting up from the surface of the disc and engaging the side of the stem opposite its inclined surface, and a spring finger carried by the disc yieldingly projecting beyond the surface thereof into engagement with said inclined surface of the stem to cooperate therewith in wedging the stem between said abutment and the spring finger.

STEPHEN F. BRIGGS.